Oct. 25, 1938.　　　　　K. TATOR　　　　　2,134,217
CONTAINER CLOSURE AND LINING COMPOSITION
Filed Sept. 4, 1934
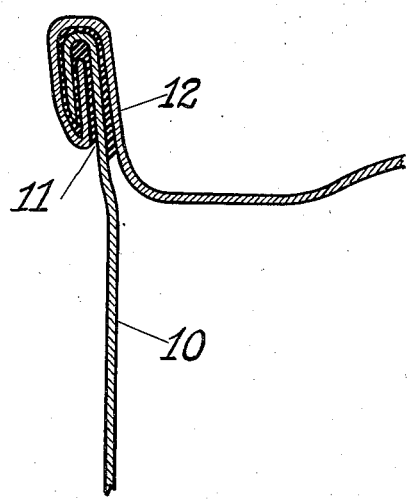
Inventor:
Kenneth Tator
By
Theodore C. Browne
Attorney Patented Oct. 25, 1938

REISSUED
SEP 17 1940

2,134,217

UNITED STATES PATENT OFFICE 2,134,217

CONTAINER CLOSURE AND LINING COMPOSITION

Kenneth Tator, Cambridge, Mass., assignor to Dewey and Almy Chemical Company, North Cambridge, Mass., a corporation of Massachusetts Application September 4, 1934, Serial No. 742,648

7 Claims. (Cl. 220—81)

This invention relates generally to the art of container closure and specifically is directed to the production of a superior lining compound. Among the objects of the invention are to provide a method of incorporating substantial amounts of fibrous fillers in the compound without at the same time unduly increasing its viscosity; to prevent substantial hydration of the fibre; and to produce a fibre-reinforced lining compound.

These and other objects will become apparent from the specification and from the drawing in which the single figure represents a greatly enlarged cross-section through a portion of a double seamed can body and end.

It has been the previous experience that organic or mineral fibres (type substances are cellulose and asbestos) cannot be added to a water-dispersed can-lining compound in substantial amounts because such fibres hydrate readily and form sluggish viscous masses quite unsuitable for can lining purposes. For example, a water slurry containing 8% of dry fibre is too stiff for the purposes of this invention. The controlling factor is, of course, the viscosity limits which are rigidly set by the nature of the lining machinery and the configuration of the can ends used.

If rubber and wood pulp or cotton fibres are worked on a rubber mill, the fibre is drawn into the rubber by the apparent process of wetting. It is my belief that the rubber particles wet the individual cellulosic fibres and also that this wetting is preferential and persists in the presence of water. In certain cases, notably with news pulp, the amount of dried fibre which can be carried in may equal the weight of the rubber. In certain other cases, as when cotton linters or cotton flock are used, this proportion cannot be obtained without producing a stock which is too short to follow or work on the mill. In such a case I follow the procedure outlined by W. B. Wescott, U. S. Patent No. 1,702,225, and beat the fibres to form a slurry, then add latex, and precipitate rubber upon the fibres in the manner he has described. When dried, such coated fibres may be milled into a rubber mass over a very wide range of proportions. If asbestos be used, I consider it advantageous but not strictly necessary to precoat the fibres with rubber latex and in such case I may utilize the process set forth by G. R. Tucker in U. S. Patents Nos. 1,907,616 and 1,907,617.

I have discovered that such high fibre content mixtures can be dispersed under certain conditions and that the coated (or rubber wetted) fibres do not hydrate in a comparable degree to untreated fibres in water. Without regard to the accuracy of my explanation of this effect, I note as a fact that I am able to produce a water dispersed lining compound containing one part of fibre to one part of rubber solids and still have a viscosity which is suitable for lining machine requirements.

I have also discovered that this effect is not limited to rubber or its analogues but occurs generally whenever a substantially non-hydratable body is used. For example, excellent low viscosity dispersions based on asphalt, paraffin and waxes may also be made.

It is widely believed that the dispersion of rubber in water is brought about by the repeated stretching of the rubber mass and the introduction of water between the rubber globules with each extrusion. It is also stated that the protective colloid serves both to carry in the water and to coat the rubber globules to prevent their re-coalescence. Whether this be true or not, the fact remains that rubber to disperse well in a mixer must originally possess some "nerve". The mixture of one part fibre, one part rubber is, however, soft and crumbly and cannot be dispersed with the cheap and commonly used dispersing agents such as kaolin and bentonite. They are unctuous and slippery. Soap dispersing agents also fail. But, I have found that the property of "nerve" need not reside in the rubber, but may be introduced as an attribute of the colloid. Substances such as casein, glue, gelatin, karaya, sea moss and the algins attach themselves so firmly to the rubber and have such high self-cohesion that the pulling and stretching of the rubber necessary to produce a dispersion can be brought about.

The seal produced by my compound is illustrated in the figure, a sectional view through a portion of the can body and end after the double seaming operation. The gasket 11, formed from the dispersion, is enfolded in and locked between the can body 10 and the can end 12. The distinguishing feature of such rubber deposits from water dispersions is the retention in the rubber aggregate of the physical constituents which characterized them in water dispersion, whereas the physical constituents of the aggregates derived from the evaporation of rubber "solutions" are disrupted and materially changed.

As a specific example of my invention, 350 parts of rubber and 350 parts of news print pulp are worked dry on a differential roll mill until the fibre is wholly absorbed. The mass is then put in a Baker-Perkins mixer and a paste containing 100 parts of casein to 1000 parts of water is added. During the process, additional water to the amount of 500 parts is run in. The mixing is continued until the rubber is thoroughly dispersed and a smooth paste is formed. Following well known procedures, I make the dispersion more stable by adding 3 to 5% NH4OH 28% and may add other dispersing agents. Compounding ingredients may be added to the mass which may be viscosity or plasticity factors such as are disclosed in the patent to Dewey and Crocker No. 1,765,134 or they may be vulcanizing agents. The addition of such factors has no effect on the general nature of the dispersion I produce.

In the same general manner, I am able to produce dispersions of wool, cattle hair, shoddy, or asbestos. As I have previously stated my invention is not limited to coating the fibres with rubber, or like substances alone, but asphalt, waxes and paraffin may be used in the manner specified. In the case of wax the addition of an ethanol amine may be found helpful—and in all cases a disinfectant or preservative aids when the dispersions are to be stored.

The above formula is, accordingly, given for illustrative purposes only and no limitation is intended by reason of the materials given or the proportions stated therein. Those familiar with the art will recognize that the proportion of fibre which can be added may vary through wide limits and that my invention possesses general utility whenever it is desired to add substantial quantities of fibre to a water dispersion.

I claim:

1. A container closure having its joint portion provided with a sealing material deposited thereon comprising the dried residue of a water dispersion of unhydrated fibers normally hydratable but which fibers at the time of incorporation in said water dispersion are protected against hydration by a water impervious coating of a substance hydratable to a low degree.

2. A container closure having its joint portion provided with a sealing material deposited thereon comprising the dried residue of a water dispersion of unhydrated fibrous particles coated with a water impervious coating of rubber, the rubber and fibrous particles being present in substantially equal amounts by weight.

3. The method of forming a container closure for hermetic sealing, which consists in depositing upon the joint portion of said closure a sealing material comprising a water dispersion of unhydrated fibers normally hydratable but which fibers at the time of incorporation in said water dispersion are protected against hydration by a water impervious coating of a substance hydratable to a low degree, and drying said deposited material.

4. The process of preparing a container closure for hermetic sealing, which consists in coating unhydrated fiber particles with a water impervious coating of rubber, forming a water dispersion of said rubber coated fibers, depositing said water dispersion on the joint portions of said closure, and drying said deposited dispersion.

5. The process of producing sealing gaskets on container closures, which comprises thoroughly milling together rubber and fibrous material in a dry state to produce an intimate homogeneous mass in which the particles of fibrous material are provided with water impervious coatings of rubber, mixing a dispersing agent with said mass, forming a water dispersion of said mass of fluid consistency, depositing the dispersion on the sealing portions of said closures, and drying the deposited dispersion.

6. The process of forming sealing gaskets on container closures which consists in milling together natural rubber and dry fibrous material in substantially equal proportions by weight to form a homogeneous mass in which the particles of fibrous material are provided with water impervious coatings of rubber, forming a water dispersion of said mass, applying said dispersion to the closure parts to be sealed, and drying said deposited dispersion to leave a solid gasket on said surface.

7. The method of forming sealing gaskets on container closures, which consists in milling together dry rubber and dry fiber to form a homogeneous mass in which the particles of fibrous material are provided with water impervious coatings of rubber, dispersing said mass in the presence of water and a hydrophilic colloid having high cohesive strength, depositing said dispersion upon the surfaces of said closures to be sealed, and drying said deposited dispersion to leave a solid gasket on said surface.

KENNETH TATOR.